Patented May 14, 1935

2,001,311

UNITED STATES PATENT OFFICE 2,001,311

PLASTIC COMPOSITION

Morris Omansky, Boston, Mass., assignor to E. W. Colledge, General Sales Agent, Inc., Jacksonville, Fla., a corporation of Florida No Drawing. Application March 31, 1932, Serial No. 602,394

4 Claims. (Cl. 106—22)

This invention relates to a plastic composition for the production of molded and other products and to the products derived therefrom.

In general, the invention has for an object the production of novel molded and other products from a plastic synthetic resin and a novel filler, and which are characterized in their plastic state by increased flowability and workability as compared to prior compositions having comparable proportions of absorptive fillers, and in their hardened state by increase in density and compactness resulting from the absorption by the novel filler of gases formed during the working of the composition in the plastic state and during the subsequent setting period. The composition of the present plastic composition is such as to enable the products to be produced possessing a true black color without the necessity of employing organic dyes, thus insuring a product which exhibits a more permanent and truer black color when subjected to grinding, cutting, breaking or upon being otherwise worked and upon aging.

In accordance with the present invention, any plastic synthetic resin which is suitable for use in the production of general molded, extruded, or similar products, may be employed as the base or binder of the composition, such for example as phenol formaldehyde resins, such as bakelite, glycerin-phthalic anhydride resins known as the glyptal resins, formaldehyde-urea resins, and others possessing the properties which render them suitable for use in the production of molded, extruded, and similar products. Resins of the character of the foregoing synthetic resins are of themselves of a relatively brittle nature, and to overcome this inherent characteristic it has been the practice to incorporate a substantial proportion of a filler of a fibrous nature, such for example as wood flour or cotton flock. These fillers increase the resistance of the plastic composition to shock, and in addition reduce the manufacturing cost of products derived therefrom. However, owing to the fibrous nature of such fillers only limited amounts thereof can be incorporated into the resins because even in the plastic state the mass becomes too stiff to be successfully worked. For economic reasons, and to extend the range of utility of the products produced from plastic compositions of the foregoing character, it has been desirable to increase the proportion of filler beyond that which has heretofore been practicable. I have discovered that finely ground charcoal may be incorporated with advantage into a synthetic resin of the type above described either alone or with other fibrous fillers, such as wood flour or cotton flock, and the plastic composition produced possesses characteristics which render it of increased commercial value, particularly with respect to the increase in the workability of the composition when in the plastic state and by the increase in density and compactness in the hardened state.

The finely ground charcoal is porous and highly absorptive, but in contra-distinction to wood flour and cotton flock is not fibrous, and as a result larger amounts thereof can be incorporated into a resin of the foregoing type without imparting excessive stiffness to the mass. In this respect charcoal differs from carbon black, lamp black, and the common inert fillers, such as barytes and whiting, in that the latter are solid and not absorptive. The chemical activity of the charcoal in absorbing gases which may be liberated from the resin during the molding or other working in the plastic state and during the subsequent setting period, is important in producing a non-porous and more compact product irrespective of the presence or absence of fibrous filler. In many commercial instances the use of a moderate proportion of charcoal alone adds to the commercial value of the molded, extruded, or otherwise formed synthetic resinous product.

For the production of a large number of commercial molded, extruded, and otherwise formed products, a smaller proportion of wood flour is desirably employed, together with a larger proportion of charcoal, and these ingredients may be incorporated into the plastic synthetic resin by means of the usual mixing and kneading machines, or in any other convenient manner. It has been my experience in producing the present plastic composition and the products derived therefrom that the finely ground charcoal may be incorporated into the mass of the plastic synthetic resin in various proportions from five percent of the weight of the resin employed up to several hundred percent, depending upon the particular characteristics as to hardness, toughness, and the like, which it is desired to impart to the final product. When used in substantial amounts, the charcoal imparts to the plastic mass a true and permanent black color, and also improves the workability of the plastic mass when compared with other compositions which have heretofore been proposed. For example, I have found that a phenolic resin plastic produced by incorporating with four parts by weight of the plastic phenolic resin, three parts by weight of wood flour, and six parts by weight of charcoal, possesses in the plastic state much more plasticity and is a more workable and flowable plastic mass than a composition produced by incorporating with four parts by weight of the same phenolic resin, six parts by weight of wood flour. In the case of the latter composition, the six parts of wood flour represented the maximum quantity that could be worked into the resin and at the same time retain the mass sufficiently plastic to enable it to be satisfactorily worked or molded. In addition, the presence of the charcoal in the composition absorbs gases which may be formed during the molding and setting, producing a product which in its hardened state is more dense and compact than comparable products of the prior art. The present plastic composition finds particular use in the production of general molded, extruded, and otherwise formed products, among which may be mentioned steering wheels for automobiles, radio panels, cash carrier cups, and closet seats. The charcoal may comprise the major portion of the composition and is relatively inexpensive, and as a result the plastic composition may be produced at a minimum expense. In the compositions embodying the present invention it will be observed that sufficient charcoal is incorporated in the filler to impart to the mass improved workability in the plastic state, thereby permitting much larger volumes of finely divided filler to be incorporated in the mass with a given amount of resin. Conversely, it may be stated that in plastic compositions embodying the present invention, by the use of the charcoal in the filler it is possible to produce the desired character of composition using less than 50% by volume of resin. In terms of volume, the proportion of parts by weight of resin, charcoal and wood flour, in the above illustrative plastic composition, may be calculated to be 3.3 parts by volume of phenolic resin; 3.3 parts by volume of charcoal; and 2.2 parts by volume of wood flour. This is approximately 38% by volume of resin. Where wood flour alone is used as the filler, 4 parts by weight of resin and 6 parts by weight of filler may be calculated to be 3.3 parts by volume of resin to 4.4 parts by colume of filler. This is approximately 43% by volume of resin which is the minimum that can be satisfactorily employed. By using charcoal, less than 43% by volume of resin can be employed.

As used throughout the claims, the term "plastic synthetic resin" is intended to define those plastic synthetic resins such as phenol formaldehyde resins, such as bakelite, glycerin-phthalic anhydride resins known as the glyptal resins, formaldehyde-urea resins, and others possessing the properties which render them suitable for use in the production of molded, extruded, and similar products.

This application is a continuation in part of my copending application Serial No. 377,619, filed July 11, 1929.

Having thus described the invention, what is claimed is:—

1. A plastic composition characterized by being sufficiently workable in the plastic state to permit the production of molded, extruded and similar products therefrom, comprising a plastic synthetic resin of the class consisting of phenol-formaldehyde resins, urea-formaldehyde resins, and glycerin-phthalic anhydride resins, and a filler containing a substantial proportion and at least an amount of finely divided charcoal equivalent to 5% of the weight of the resin, the amount of resin in the plastic composition being less than 43% by volume of the mass and the amount of charcoal being sufficient to render the composition workable in the plastic state so as to permit the production of molded, extruded and similar products.

2. A plastic composition characterized by being sufficiently workable in the plastic state to permit the production of molded, extruded and similar products therefrom, comprising a phenol formaldehyde resin and a filler containing a substantial proportion and at least an amount of finely divided charcoal equivalent to 5% of the weight of the resin, the amount of resin in the plastic composition being less than 43% by volume of the mass and the amount of charcoal being sufficient to render the composition workable in the plastic state so as to permit the production of molded, extruded and similar products.

3. A plastic composition characterized by being sufficiently workable in the plastic state to permit the production of molded, extruded and similar products therefrom, comprising a glycerin-phthalic anhydride resin and a filler containing a substantial proportion and at least an amount of finely divided charcoal equivalent to 5% of the weight of the resin, the amount of resin in the plastic composition being less than 43% by volume of the mass and the amount of charcoal being sufficient to render the composition workable in the plastic state so as to permit the production of molded, extruded and similar products.

4. A plastic composition characterized by being sufficiently workable in the plastic state to permit the production of molded, extruded and similar products therefrom, comprising a formaldehyde-urea resin and a filler containing a substantial proportion and at least an amount of finely divided charcoal equivalent to 5% of the weight of the resin, the amount of resin in the plastic composition being less than 43% by volume of the mass and the amount of charcoal being sufficient to render the composition workable in the plastic state so as to permit the production of molded, extruded and similar products.

MORRIS OMANSKY.